United States Patent
Lin et al.

(10) Patent No.: US 12,527,745 B2
(45) Date of Patent: Jan. 20, 2026

(54) PHARMACEUTICAL DOSAGE FORM FOR AN EMULSION OF SIMETHICONE AND LOPERAMIDE

(71) Applicant: R.P. SCHERER TECHNOLOGIES, LLC, Carson City, NV (US)

(72) Inventors: Jing Lin, Keysborough (AU); Humera Ahmad, Endeavour Hills (AU); Ashish Patel, Cranbourne East (AU)

(73) Assignee: R.P. SCHERER TECHNOLOGIES, LLC, Carson City, NV (US)

( * ) Notice: Subject to any disclaimer, the term of this patent is extended or adjusted under 35 U.S.C. 154(b) by 0 days.

(21) Appl. No.: 16/975,911

(22) PCT Filed: Feb. 26, 2019

(86) PCT No.: PCT/US2019/019564
§ 371 (c)(1),
(2) Date: Aug. 26, 2020

(87) PCT Pub. No.: WO2019/165420
PCT Pub. Date: Aug. 29, 2019

(65) Prior Publication Data
US 2021/0378970 A1   Dec. 9, 2021

Related U.S. Application Data

(60) Provisional application No. 62/635,138, filed on Feb. 26, 2018.

(51) Int. Cl.
| | |
|---|---|
| *A61K 9/48* | (2006.01) |
| *A61K 9/00* | (2006.01) |
| *A61K 9/107* | (2006.01) |
| *A61K 31/451* | (2006.01) |
| *A61K 31/80* | (2006.01) |

(52) U.S. Cl.
CPC .......... *A61K 9/4866* (2013.01); *A61K 9/0053* (2013.01); *A61K 9/107* (2013.01); *A61K 9/4825* (2013.01); *A61K 9/4833* (2013.01); *A61K 31/451* (2013.01); *A61K 31/80* (2013.01)

(58) Field of Classification Search
CPC .... A61K 9/4866; A61K 9/0053; A61K 9/107; A61K 9/4825; A61K 9/4833; A61K 31/451; A61K 31/80
See application file for complete search history.

(56) References Cited

U.S. PATENT DOCUMENTS

| | | | | |
|---|---|---|---|---|
| 3,376,199 A * | 4/1968 | Coles | ........ | A61K 39/13 |
| | | | | 424/217.1 |
| 5,248,505 A | 9/1993 | Garwin | | |
| 5,612,054 A | 3/1997 | Garwin | | |
| 5,980,944 A | 11/1999 | Stevens et al. | | |
| 6,024,980 A | 2/2000 | Hoy | | |
| 6,103,260 A | 8/2000 | Luber et al. | | |
| 6,267,985 B1 | 7/2001 | Chen et al. | | |
| 7,341,742 B2 | 3/2008 | Danielson et al. | | |
| 7,820,145 B2 * | 10/2010 | Tamarkin | ........ | A61P 29/00 |
| | | | | 424/45 |
| 8,329,221 B2 | 12/2012 | Thoorens et al. | | |
| 8,632,818 B2 | 1/2014 | Thoorens et al. | | |
| 9,700,510 B2 | 7/2017 | Dann et al. | | |
| 11,690,802 B2 | 7/2023 | Ketelson et al. | | |
| 2002/0032171 A1 * | 3/2002 | Chen | ........ | A61K 9/4858 |
| | | | | 424/731 |
| 2005/0031547 A1 * | 2/2005 | Tamarkin | ........ | A61P 37/00 |
| | | | | 424/47 |
| 2007/0134493 A1 | 6/2007 | Meghpara | | |
| 2007/0293479 A1 | 12/2007 | Osinga et al. | | |
| 2008/0050317 A1 * | 2/2008 | Tamarkin | ........ | A61K 8/046 |
| | | | | 222/395 |
| 2009/0011047 A1 | 1/2009 | Rademaker | | |
| 2011/0136912 A1 | 6/2011 | Ketelson et al. | | |
| 2011/0229527 A1 | 9/2011 | Deorkar et al. | | |
| 2012/0251628 A1 | 10/2012 | Min | | |
| 2013/0039874 A1 * | 2/2013 | Li | ........ | A61K 8/8152 |
| | | | | 424/70.7 |
| 2013/0303495 A1 * | 11/2013 | Dhingra | ........ | A61K 47/44 |
| | | | | 514/181 |
| 2013/0344145 A1 | 12/2013 | Bernardo Escudero et al. | | |

(Continued)

FOREIGN PATENT DOCUMENTS

| | | |
|---|---|---|
| CN | 101836996 A | 9/2010 |
| EP | 0815855 A1 | 1/1998 |

(Continued)

OTHER PUBLICATIONS

Schott, J.. Comments on Hydrophile-Lipophile Balance Systems. J. Pharm. Sciences, 1990, 79(1):87-88. (Year: 1990).*
International Search Report and Written Opinion in corresponding International Application No. PCT/US2019/019564 (7 pages).
J. Macedo, et al., "Micro-emultrocrit Technique: A Valuable Tool for Determination of Critical HLB Value of Emulsions", AAPS PharmaSciTech 2006, Article 21, pp. E1-E7.

(Continued)

*Primary Examiner* — Robert A Wax
*Assistant Examiner* — Olga V. Tcherkasskaya
(74) *Attorney, Agent, or Firm* — VENABLE LLP

(57) ABSTRACT

A pharmaceutical dosage form comprises a capsule shell and a fill composition, wherein the fill composition comprises an emulsion of (a) simethicone, (b) loperamide or a pharmaceutically acceptable salt thereof, and (c) at least two surfactants, wherein the emulsion has a hydrophilic lipophilic balance ranging from about 8 to about 12. Also described are methods of making the pharmaceutical dosage forms and methods for treating humans suffering from gastrointestinal distress.

20 Claims, No Drawings

(56) References Cited

U.S. PATENT DOCUMENTS

| | | | |
|---|---|---|---|
| 2014/0005262 A1* | 1/2014 | Lee | A61P 1/12 514/513 |
| 2014/0271832 A1* | 9/2014 | Lee | A61K 9/4858 514/538 |
| 2014/0275246 A1* | 9/2014 | Lee | A61K 9/4858 514/513 |
| 2015/0119422 A1 | 4/2015 | Velada et al. | |
| 2015/0231072 A1 | 8/2015 | Dann et al. | |
| 2015/0238429 A1 | 8/2015 | Fang et al. | |
| 2016/0279056 A1 | 9/2016 | Zhao et al. | |
| 2016/0331684 A9* | 11/2016 | Lee | A61K 47/44 |
| 2016/0374948 A1 | 12/2016 | Wengner | |
| 2017/0000741 A1 | 1/2017 | Betz et al. | |

FOREIGN PATENT DOCUMENTS

| | | | |
|---|---|---|---|
| EP | 2170295 B1 | 4/2015 | |
| EP | 3104843 A | 12/2016 | |
| EP | 3682872 A1 * | 7/2020 | ........... A61K 9/4866 |
| ES | 2183089 T3 | 3/2003 | |
| ES | 2537063 T3 | 6/2015 | |
| JP | 3-206048 A | 9/1991 | |
| JP | 10-182437 A | 7/1998 | |
| JP | 2011-201914 A | 10/2011 | |
| JP | 2013-241363 A | 12/2013 | |
| JP | 2016-761 A | 1/2016 | |
| JP | 2017-500355 A | 1/2017 | |
| RU | 2602745 C2 | 2/2016 | |
| WO | 2008/056200 A1 | 5/2008 | |
| WO | 2014/101986 A | 7/2014 | |
| WO | 2015/100234 A1 | 7/2015 | |
| WO | 2016/094567 A1 | 6/2016 | |

OTHER PUBLICATIONS

European Extended Search Report issued Nov. 19, 2021, in corresponding application EP 19757022.9. (8 pages).

* cited by examiner

PHARMACEUTICAL DOSAGE FORM FOR AN EMULSION OF SIMETHICONE AND LOPERAMIDE

FIELD OF THE INVENTION

The invention relates to a stable pharmaceutical dosage form comprising an emulsion of simethicone and loperamide, a method of preparing said pharmaceutical dosage form, and a method of using said pharmaceutical dosage form in the treatment of intestinal disorders and gastrointestinal distress.

BACKGROUND OF THE INVENTION

Soft gelatin capsules or softgels are dosage forms which are capable of retaining liquid fill material. Typically, softgels are used to contain orally consumable materials such as vitamins and pharmaceutical compositions in a liquid vehicle or carrier. This type of dosage form is more readily accepted by patients, since the capsules are easy to swallow and need not be flavored in order to mask any unpleasant taste of the active agent. Softgel encapsulation of drugs further provides the potential to improve the bioavailability of the pharmaceutical agents. For example, active ingredients may be rapidly released in liquid form as soon as the gelatin shell ruptures.

Gastrointestinal distress, for the purposes of the present invention, is defined as discomfort associated with an intestinal disorder characterized by symptoms of diarrhea and/or flatulence or gas. Diarrhea is the abnormally frequent passage of watery stool. Diarrhea may have a variety of causes including bacteria or viruses. Traveler's diarrhea, for example, is believed to be of microbial origin. Diarrhea may also be a side effect of drug administration, particularly antibiotics. Diarrhea may be induced by food intolerance which is caused by allergy or the ingestion of foods that are excessively fatty, spicy, or contain a high degree of fermentable carbohydrate, roughage or a large number of seeds. Food intolerance may also be brought on by a preformed toxin in the food, thus causing food poisoning. Other conditions and diseases can also cause diarrhea, and diarrhea may be only one of many symptoms associated with a major illness. Flatulence or intestinal gas is another intestinal disorder which contributes to gastrointestinal distress especially during diarrhea. Such gas exists as trapped gas bubbles which manifest with feelings of pain, bloating and cramping in the abdominal area.

Loperamide or a pharmaceutically acceptable salt thereof is an anti-diarrheal. Loperamide acts by slowing intestinal motility and by normalizing water and electrolyte movement through the bowel. Thus, loperamide can prolong the transit time of intestinal contents, reduce the daily fecal volume and increase the viscosity and bulk density of the feces, thereby diminishing loss of foods and electrolytes from the body. Additionally, loperamide may inhibit peristaltic activity by a direct effect on circular and longitudinal muscles of the intestinal walls.

Simethicone is an antiflatulent/antifoaming agent. Simethicone is a viscous liquid which is a mixture of polydimethylsiloxane and silicon dioxide. Simethicone is a surface active agent which acts as a defoamer or dispersant of gas bubbles by changing the surface tension of the bubbles to enable them to coalesce. The defoaming action of simethicone relieves flatulence by dispersing and preventing the formation of mucous-surrounded gas pockets in the gastrointestinal tract. By reducing the size of the gas bubbles, the gas is free to travel through the gastrointestinal tract for release by belching or passing flatus. This release thus relieves the pain and pressure commonly associated with the presence of gas in the gastrointestinal tract.

The combination of loperamide and simethicone has been used in pharmaceutical compositions for treating gastrointestinal distress, by combining the antidiarrheal effect of loperamide with the anti-flatulent effect of simethicone. However, simethicone in contact with loperamide may adversely affect the dissolution profile of loperamide due to the highly hydrophobic nature of simethicone.

For example, U.S. Pat. No. 6,024,980 discloses a pharmaceutical product containing loperamide hydrochloride and simethicone. An intimate mixture of loperamide hydrochloride and simethicone results in deleterious effects on the loperamide hydrochloride dissolution profile. In order to provide an immediate release profile, this pharmaceutical product is formed from first and second phases which are disposed in discrete regions and have at least one interface with each other. However, this formulation is not viable, since it is physically and chemically unstable due to the presence of common ingredients (such as polyethylene glycol) in both phases leading to the progressive migration of loperamide from one phase to the other phase resulting in the reduction of the dissolution profile. Also, the requirement for two distinct phases in the formulation presents challenges for manufacturing softgel capsules from the formulation using a rotary die process.

U.S. Pat. No. 5,980,944 discloses a solid oral dosage form having an immediate release profile for the treatment of gastrointestinal disorders. This solid oral dosage form comprises granules of a pharmaceutical which may be diphenoxylate, loperamide, loperamide-N-oxide, pharmaceutically acceptable salts thereof or combinations thereof, and a therapeutically effective amount of simethicone. The pharmaceutical and simethicone are separated from one another by a barrier coat on the granules which is substantially impermeable to simethicone.

A fixed dose combination of loperamide HCl and simethicone is available in certain solid forms and sold under the trademark IMMODIUM® Multi-Symptom Relief caplets and IMMODIUM® Duo caplets and chewable tablets—2 mg of loperamide, 125 mg of simethicone from Johnson & Johnson Consumer Inc. These solid dosage forms have the advantage of providing a quick dissolution rate of loperamide, but have a somewhat unpleasant bitter taste at least due to the presence of loperamide.

There remains a need for a physically and chemically stable pharmaceutical formulation of loperamide and simethicone that can be easily formulated into a capsule, preferably a softgel capsule, where loperamide is in soluble form, which meets the uniformity and dissolution requirements for loperamide, and which is easy to swallow. It is not a routine matter to provide such a formulation due to the highly hydrophobic nature of simethicone, which adversely affects the dissolution profile of loperamide. Thus, an object of this invention is to provide a formulation containing both loperamide and simethicone, which is physically and chemically stable, and has an excellent loperamide dissolution rate, e.g., as compared to formulations such as are disclosed in U.S. Pat. No. 6,024,980.

SUMMARY OF THE INVENTION

The present invention is directed to a pharmaceutical dosage form comprising a capsule shell and a fill composition comprising an emulsion of (a) simethicone, (b) loperamide or a pharmaceutically acceptable salt thereof, and (c) at least two surfactants. The emulsion has a hydrophilic lipophilic balance ("HLB") in the range of about 8 to about 12, more preferably about 9 to about 11, and most preferably about 10 to about 11.

The present invention is also directed to a method for preparing the pharmaceutical dosage form of the present invention. Additionally, the present invention is also directed to a method of treating gastrointestinal distress characterized by the symptoms of diarrhea and/or flatulence or gas.

The following description sets forth exemplary methods, parameters, and the like. It should be recognized, however, that such description is not intended as a limitation on the scope of the present disclosure but is instead provided as a description of exemplary embodiments.

DETAILED DESCRIBTION OF THE INVENTION

The present invention advances the state of the art by developing a simethicone and loperamide emulsion for use in capsules, preferably softgel capsules, that achieves the advantages associated with formulations having two distinct phases without the need to physically separate the active ingredients.

As used herein, "capsule" refers to the entire inventive pharmaceutical dosage form including the capsule shell and the fill encapsulated therein. As used herein, "capsule shell" refers to both hard and soft capsule shells, made by known processes or purchased from commercial suppliers. As used herein, the term "softgel" or "softgel capsule" or "soft capsule" includes, without limitation, gelatin-free soft capsules and conventional gelatin-based soft capsules.

As used herein, "fill material" or "fill" refers to the composition that is encapsulated by the capsule shell that contains at least one active ingredient. Preferably, the fill composition comprises an emulsion of simethicone and loperamide or a pharmaceutically acceptable salt thereof.

As used herein, "emulsion" refers to a water-in-oil emulsion made according to known techniques.

A "pharmaceutically acceptable salt" is intended to mean a salt that retains the biological effectiveness of the free base of the loperamide compound and that is not biologically or otherwise undesirable. Since loperamide is a base, the desired pharmaceutically acceptable salt may be prepared by any suitable method available in the art, for example, treatment of the free base with an inorganic acid, such as hydrochloric acid, hydrobromic acid, sulfuric acid, nitric acid, phosphoric acid and the like, or with an organic acid, such as acetic acid, maleic acid, succinic acid, mandelic acid, fumaric acid, malonic acid, pyrovic acid, oxalic acid, glycolic acid, salicylic acid, a pyranosidyl acid, such as glucuronic acid or galacturonic acid, an alpha-hydroxy acid, such as citric acid or tartaric acid, an amino acid, such as aspartic acid or glutamic acid, an aromatic acid, such as benzoic acid or cinnamic acid, a sulfonic acid, such as p-toluenesulfonic acid or ethanesulfonic acid, or the like.

As used herein, "about" refers to any values that are within a variation of +10%.

As used herein, "a" or "an" refers to one or more, unless otherwise specified.

As used herein, "therapeutically effective amount" refers to an amount that may be effective to elicit the desired biological or medical response, including the amount of a compound that, when administered to a subject for treating a condition, is sufficient to effect such treatment for the condition. The effective amount will vary depending on the condition and its severity, as well as the age, weight and physical condition of the subject, as well as the duration of treatment and the like.

The terms "treatment" or "treating," as used herein, include therapeutic and/or prophylactic treatment as described herein. With respect to the treatment of gastrointestinal distress, such treatment includes the reduction or alleviation of symptoms associated with diarrhea and/or flatulence or gas, including but not limited to pain, bloating and cramping in the abdominal area.

Any type of surfactant has an HLB number. For example, the HLB of polysorbate 80 is 15 and the HLB of sorbitan mono-oleate is 4.3. HLB is a numerical system used to describe the affinity of a surfactant or combination of surfactants for water or oil. According to well-established principles, the combination of a high HLB surfactant and a low HLB surfactant may be more effective compared to a single surfactant alone. The combined HLB value of two surfactants (e.g., A and B) may be determined, for example, using the Griffin equation: $X = HLB_A * A\% + HLB_B * B\%$.

According to a first embodiment, a pharmaceutical dosage form comprises a capsule shell and a fill composition. The fill composition comprises an emulsion of (a) simethicone, (b) loperamide or a pharmaceutically acceptable salt thereof, and (c) at least two surfactants, the emulsion having an HLB value preferably between about 8 and about 12, more preferably between about 9 and about 11, and most preferably between about 10 and about 11.

The capsule shell can be made according to known manufacturing processes or purchased from commercially available sources. As noted above, the capsule shell of the invention includes, without limitation, gelatin-free soft capsule shells, conventional gelatin-based soft capsule shells, and carrageenan-based capsule shells, as well as hard capsule shells. There is no limitation on the materials suitable for use in the capsule shells of the invention. Preferably the capsule shell is a soft capsule shell, more preferably a gelatin-based soft capsule shell or softgel, made according to known manufacturing processes. The size of the capsule shell typically ranges from about 3 minim to about 22 minim, more preferably from about 3 minim to about 10 minim, and most preferably from about 4 minim to about 6 minim.

The fill composition is encapsulated by, i.e., contained within, the capsule shell according to the invention and contains at least the simethicone, the loperamide or pharmaceutically acceptable salt thereof, and at least two surfactants. The amount of fill composition typically ranges from about 170 mg to about 1250 mg, more preferably from about 170 mg to about 570 mg, and most preferably from about 180 mg to about 290 mg. Typically the fill composition fills the entire inner volume of the capsule shell.

Simethicone suitable for use in the present invention can be purchased from commercially available sources, e.g., Dow Corning. In an embodiment, the amount of simethicone in the fill composition is about 20 mg to about 500 mg, more preferably about 40 mg to about 240 mg, and most preferably about 125 mg per capsule.

In an embodiment, simethicone is diluted with solvent before being included in the emulsion. Suitable solvents include, but are not limited to, low polarity solvents including aliphatic esters such as isopropyl myristate. The concentration of the simethicone in the solution prior to emulsification typically ranges from about 5% to about 80%, more preferably from about 20% to about 75%, and most preferably from about 50% to about 70%. The weight percentage of simethicone in the fill composition after emulsification typically ranges from about 4 w/w % to about 66 w/w %, more preferably about 17 w/w % to about 62 w/w %, and most preferably from about 41 w/w % to about 57 w/w %.

Loperamide, or a pharmaceutically acceptable salt thereof, suitable for use in the present invention can be made according to known methods or purchased from commercially available sources. In an embodiment, a pharmaceutically acceptable salt of loperamide is formed from one or more of hydrochloric acid, hydrobromic acid, sulfuric acid, nitric acid, phosphoric acid, acetic acid, maleic acid, succinic acid, mandelic acid, fumaric acid, malonic acid, pyrovic acid, oxalic acid, glycolic acid, salicylic acid, a pyranosidyl acid, an alpha-hydroxy acid, an amino acid, an aromatic acid, and a sulfonic acid. In one embodiment, the pharmaceutically acceptable salt of loperamide is loperamide hydrochloride. In an embodiment, the amount of loperamide or pharmaceutically acceptable salt thereof in the fill composition is about 0.5 mg to about 16 mg, more preferably about 1 mg to about 4 mg, and most preferably about 2 mg per capsule.

In an embodiment, loperamide or a pharmaceutically acceptable salt thereof is in solution before being included in the emulsion. Suitable solvents include, but are not limited to, glycols such as polyethylene glycol, glycerol, propylene glycol, and ethylene glycol, water and combinations thereof. In some embodiments, the solution may further comprise an antioxidant such as butylated hydroxyl anisole, butylated hydroxytoluene or other antioxidants that are soluble in the hydrophilic phase described. The concentration of the loperamide or pharmaceutically acceptable salt thereof in the solution prior to emulsification typically ranges from about 1% to about 15%, more preferably from about 2% to about 10%, and most preferably from about 3 to about 6%. The weight percentage of loperamide in the fill composition after emulsification typically ranges from about 0.2 w/w % to about 2.7 w/w %, more preferably about 0.4 w/w % to about 1.8 w/w %, and most preferably from about 0.54 w/w % to about 1.07 w/w %.

Surprisingly, it was found that the emulsions of the present invention possess satisfactory loperamide dissolution rates even in the presence of highly hydrophobic simethicone at high concentration. Accordingly, the pharmaceutical dosage form according to the present invention does not have significant adverse effects on the loperamide dissolution rate.

Surfactants suitable for use in the present invention include, without limitation, hydrophilic surfactants and lipophilic surfactants. In an embodiment, the emulsion of the fill composition comprises at least one hydrophilic surfactant and at least one lipophilic surfactant. The emulsion of the present invention requires at least two surfactants such that the HLB of the emulsion ranges from about 8 to about 12, more preferably from about 9 to about 11, and most preferably from about 10 to about 11.

Examples of hydrophilic surfactants that may be used in the present invention include, without limitation, polyethylene-glycol (PEG) fatty acid esters, PEG esters, PEG ethers, and PEG glycerides, such as PEG 35 Castor oil (Etocas 35, Croda), Polysorbate 85 (or Crillet 45, Croda), Polysorbate 80 (or Crillet 4, Croda), PEG 40 hydrogenated castor oil (e.g., Cremophor RH40, BASF), and saturated polyglycolysed glycerides (Labrafac Hydro WL1219, Gattefosse, France), and combinations thereof.

Examples of lipophilic surfactants that may be used in the present invention include, without limitation, non-ionic surfactants with HLB values less than 8, such as macrogolglycerides, sorbitan esters and mono- and diglycerides, glycol mono and diesters, glyceryl esters, PEG esters, such as linoleoyl macrogolglycerides (e.g., Labrafil M 2125 from Gattefosse, France), oleoyl macrogolglycerides (e.g., Labrafil M 1944 from Gattefosse, France), propylene glycol laurate (e.g., Lauroglycol FCC from Gattefosse, France), glyceryl mono-oleate (Croda), Span 80 (Croda), i.e., sorbitan mono-oleate, and medium chain mono- and di-glycerides (e.g., Capmul MCM C8 from Abitec Corporation, Columbus, Ohio), and combinations thereof.

In an embodiment, the fill composition may optionally comprise additional agents such as flavorings agents, stabilizing agents, buffering agents, pH adjusting agents, thickening agents, antioxidants, diluents or solvents. Amounts of flavoring agents, stabilizing agents, buffering agents, pH adjusting agents, thickening agents, antioxidants, diluents, solvents (including solvents combined with simethicone and loperamide prior to emulsification), and surfactants may be readily determined by one of ordinary skill in the art, given desired amounts of active ingredients and desired HLB of fill composition emulsion.

The fill composition, i.e., emulsion, is made using known emulsification methods as further described below. In fact, an emulsion suitable for use in the present invention can be effectively made with basic equipment such as a standard mechanical stirrer or a simple stirring device. In other words, there is no need to prepare the emulsion using any type of high shear mixing equipment (though such equipment can be used if desired). Thus, the manufacturing process is more economical as compared to most conventional emulsification methods.

The fill composition of the invention is most preferably a translucent emulsion. In other words, the emulsion appears almost clear. A translucent emulsion contains very fine droplets of the loperamide solution; it enables complete release of loperamide upon rupture of the capsule shell. In an embodiment, the droplets are about 100 nm to about 500 nm in size, i.e., a nanoemulsion. The fill composition may also be an emulsion having a "milky" appearance, depending on droplet size formed.

The pharmaceutical dosage form of the present invention is chemically stable. Chemical stability of the pharmaceutical dosage form and/or fill composition can be tracked by measuring the content of loperamide or pharmaceutically acceptable salt thereof and its degradation products. The main degradation product of loperamide is the N-oxide form degradation product, the concentration of which can be determined by known testing methods to determine the level of loperamide degradation in the formulation, e.g., upon storage at a relative humidity of 60% and a temperature of 25° C., at a relative humidity of 75% and a temperature of 30° C., and at a relative humidity of 75% and a temperature of 40° C., when measured according to a recognized stability testing method under International Conference on Harmonization (ICH) storage conditions. In accordance with the present invention, a chemically stable formulation contains less than about 2.0%, more preferably less than about 1.0%, still more preferably less than about 0.5%, and most preferably less than about 0.2% of the N-oxide form degradation product. In an embodiment, the emulsion, and the pharmaceutical dosage form, is chemically stable for a period of at least 180 days, preferably at least one year, more preferably at least 2 years and most preferably at least 3 years, when measured at 25° C. In an embodiment, the emulsion, and the pharmaceutical dosage form, is chemically stable for a period of at least 180 days, preferably at least one year, more preferably at least 2 years and most preferably at least 3 years, when measured at 30° C.

In an embodiment, in a fill composition in accordance with the present invention at 2 weeks at 25° C./60% relative humidity (i.e. RH), the percent of a specified impurity (as a % of loperamide weight), for example, N-oxide cis+trans is less than about 0.08%, more preferably less than about 0.06%, and most preferably about less than 0.04%. At 2 weeks at 30° C./75%, the percent area is less than about 0.10%, more preferably less than about 0.08%, and most preferably less than about 0.06%. At 2 weeks at 40° C./75%, the percent area is less than about 0.06%, more preferably less than about 0.04%, and most preferably less than about 0.02%.

In an embodiment, in a fill composition in accordance with the present invention at 2 weeks at 25° C./60%, the percent area for the total of non-specified impurities is less than about 0.09%, more preferably less than about 0.07%, and most preferably less than about 0.05%. At 2 weeks at 30° C./75%, the percent area is less than about 0.13%, more preferably less than about 0.11%, and most preferably less than about 0.09%. At 2 weeks at 40° C./75%, the percent area is less than about 0.17%, more preferably less than about 0.15%, and most preferably less than about 0.13%.

In an embodiment, in a capsule composition in accordance with the present invention at 3 months at 25° C./60%, percent area for a specified impurity, for example, N-oxide cis+trans is less than about 2% more preferably less than about 1%, and most preferably less than about 0.03%. At 3 months at 30° C./75%, the percent area is about less than 2%, more preferably less than about 1%, and most preferably less than about 0.05%.

In an embodiment, in a capsule composition in accordance with the present invention at 3 months at 25° C./60%, the percent area for the total of non-specified impurities is less than about 3%, more preferably less than about 1.5%, and most preferably less than about 0.08%. At 3 months at 30° C./75%, the percent area is less than about 3%, more preferably less than about 1.5%, and most preferably less than about 0.10%.

In an embodiment, in a capsule comprising a fill composition in accordance with the present invention at 6 months at 25° C./60%, the percent area for a specified impurity, for example, N-oxide cis+trans is less than about 2%, more preferably less than about 1%, and most preferably less than about 0.2%. At 6 months at 30° C./75%, the percent area is less than about 2%, more preferably less than about 1%, and most preferably less than about 0.2%. At 6 months at 40° C./75%, the percent area is less than about 2%, more preferably less than about 1%, and most preferably less than about 0.2%.

In an embodiment, in a capsule comprising a fill composition in accordance with the present invention at 6 months at 25° C./60%, the percent area for the total of non-specified impurities is less than about 3%, more preferably less than about 1.5%, and most preferably less than about 0.2%. At 6 months at 30° C./75%, the percent area is less than about 3%, more preferably less than about 1.5%, and most preferably less than about 0.2%. At 6 months at 40° C./75%, the percent area is less than about 3%, more preferably less than about 1.5%, and most preferably less than about 0.3%

In an embodiment, in a capsule comprising a fill composition in accordance with the present invention at 12 months at 25° C./60%, percent area for a specified impurity, for example, N-oxide cis+trans is less than about 2% more preferably less than about 1%, and most preferably less than about 0.08%. At 12 months at 30° C./75%, the percent area is about less than 2%, more preferably less than about 1%, and most preferably less than about 0.16%.

In an embodiment, in a capsule comprising a fill composition in accordance with the present invention at 12 months at 25° C./60%, the percent area for the total of non-specified impurities is less than about 3%, more preferably less than about 1.5%, and most preferably less than about 0.13%. At 12 months at 30° C./75%, the percent area is less than about 3%, more preferably less than about 1.5%, and most preferably less than about 0.16%.

In an embodiment, in a capsule comprising a fill composition in accordance with the present invention at 24 months at 25° C./60%, percent area for a specified impurity, for example, N-oxide cis+trans is less than about 2% more preferably less than about 1%, and most preferably less than about 0.07%. At 24 months at 30° C./75%, the percent area is about less than 2%, more preferably less than about 1%, and most preferably less than about 0.10%.

In an embodiment, in a capsule comprising a fill composition in accordance with the present invention at 24 months at 25° C./60%, the percent area for the total of non-specified impurities is less than about 3%, more preferably less than about 1.5%, and most preferably less than about 0.07%. At 24 months at 30° C./75%, the percent area is less than about 3%, more preferably less than about 1.5%, and most preferably less than about 0.2%.

In an embodiment, the dissolution rate of loperamide or pharmaceutically acceptable salt thereof in the pharmaceutical dosage form, and the emulsion, is at least 75% (Q) in 45 minutes, preferably at least 85% in 30 minutes. As used herein, the term "dissolution rate" or "dissolution profile" refers to the weight percentage of loperamide or a pharmaceutically acceptable salt thereof dissolved in the dissolution media in the stated time period, based on the total weight of the loperamide or the pharmaceutically acceptable salt thereof contained in the formulation. The dissolution rate is typically measured using USP apparatus type II of the United States Pharmacopeial Convention (2011) at 100 rpm, using 0.1N HCl as the dissolution media. A sinker may be used to determine the dissolution rate as it lifts the capsule off the bottom of the dissolution flask.

Another embodiment of the invention is a process for making the pharmaceutical dosage form of the first embodiment of the invention. This process includes the steps of (a) preparing the fill composition and (b) encapsulating the fill composition in the capsule shell. All details regarding the pharmaceutical dosage form are the same as those set forth with regard to the first embodiment described above.

Preparing the fill composition may include the sub-step of preparing an emulsion including (a) simethicone, (b) loperamide or a pharmaceutically acceptable salt thereof, and (c) at least two surfactants. Additional sub-steps may include combining loperamide or a pharmaceutically acceptable salt thereof with one or more solvents and optionally, an antioxidant to form a solution; premixing simethicone and solvent(s); premixing simethicone, with or without solvent(s), and at least two surfactants; and combining the loperamide solution with the simethicone premix to form an emulsion.

The process may include a sub-step of combining the loperamide or a pharmaceutically acceptable salt thereof with one or more solvents and optionally, an antioxidant, under stirring at about 40° C.-60° C. Once a solution is achieved, it may be cooled to about 20° C.-30° C.

The process may include a sub-step of combining simethicone and solvent(s) and/or at least two surfactants under stirring at about 20° C.-30° C. for at least 10 minutes, preferably at least 15 minutes.

The process may further include a step of adding simethicone, solvent(s) and at least two surfactants, together or in sequence to the solution containing loperamide or a pharmaceutically acceptable salt thereof and continuing to stir at about 20° C.-35° C. to create an emulsion. In an embodiment, the solution containing the loperamide or a pharmaceutically acceptable salt thereof is added to the solution containing simethicone, solvent(s) and at least two surfactants.

As noted above, overall the emulsion is made using any known emulsification method. In fact, an emulsion suitable for use in the present invention can be effectively made with basic equipment such as a standard mechanical stirrer or a simple stirring apparatus. In other words, there is no need to prepare the emulsion using any type of high shear mixing equipment (though such equipment can be used if desired). Thus, the manufacturing process is more economical as compared to most conventional emulsification methods.

Encapsulation of the fill material can be accomplished in any conventional manner as well. As an example, a rotary die encapsulation may be used. A known rotary die process consists of forming endless strips of capsule shell material from a molten mass which is of viscous consistency and has, for example, a gelatin or carrageenan base. The thickness of the gelatin strip can, of course, be selected according to the eventual intended use of the capsule. The gelatin mass comprises the base material itself, for example, gelatin or carrageenan, plasticizer such as glycerin or sorbitol and sorbitan aqueous solution plasticizers such as Polysorb® plasticizers, and water in varying proportions depending on the eventual use and the formulations to be encapsulated. The amount and type of plasticizers used in the capsule shell can be adjusted using methods known in the art to maintain the stability of the shell and/or to accommodate particular fill formulations of the present invention.

Another embodiment of the invention is a method of treating a human having gastrointestinal distress characterized by the symptoms of diarrhea and/or flatulence or gas comprising: orally administering to the human a therapeutically effective amount of pharmaceutical dosage form according to the first embodiment of the invention, i.e., a formulation containing: (a) simethicone, (b) loperamide or a pharmaceutically acceptable salt thereof, and (c) at least two surfactants, the emulsion having an HLB value between about 8 and about 12, more preferably about 9 to about 11, and most preferably about 10 to 11. All details regarding the pharmaceutical dosage form are the same as those set forth with regard to the first embodiment described above.

Suitable dosing regimens and pharmaceutically effective amount can be readily determined by one of ordinary skill in the art. In an embodiment, the pharmaceutically effective amount is contained in a single dosage form according to the invention, and more preferably is about 125 mg simethicone and about 2 mg loperamide, most preferably loperamide hydrochloride.

Specific embodiments of the invention will now be demonstrated by reference to the following examples. It should be understood that these examples are disclosed solely by way of illustrating the invention and should not be taken in any way to limit the scope of the present invention.

Examples 1-3

Fill compositions were prepared having the compositions set forth in Table 1 below. The fill composition of Example 1 was subsequently encapsulated in a gelatin-based softgel capsule shell by conventional means. For the fill compositions, a premix of loperamide hydrochloride, propylene glycol, water and butylated hydroxyl anisole (if present) was made in a small jacketed vessel. The mixture was heated at 50° C.-60° C. and stirred for about 30 minutes. Once the mixture was a clear solution, the solution was cooled to 20° C.-30° C. In a main vessel, simethicone, isopropyl myristate, sorbitan mono-oleate, polyethylene glycol (if present) and polysorbate 80 were added and stirred at a temperature of 20° C.-30° C. for about 15 minutes. The loperamide solution was added to the main vessel, stirred at a temperature of 20° C.-30° C. for about 30 minutes, and then encapsulated into softgel capsules.

TABLE 1

|  | Example 1 % w/w | Example 2 % w/w | Example 3 % w/w |
| --- | --- | --- | --- |
| Simethicone | 55.56 | 49.9 | 53.6 |
| Loperamide hydrochloride | 0.89 | 0.8 | 0.9 |
| Isopropyl myristate | 27.27 | 6.0 | 6.4 |
| Sorbitan Mono-oleate | 1.31 | 0.5 | 1.3 |
| Polysorbate 80 | 1.49 | 2.0 | 1.4 |
| Propylene Glycol | 13.33 | 12.0 | 12.9 |
| Butylated hydroxyl anisole | 0.15 | — | — |
| Polyethylene Glycol 400 | — | 24.8 | 19.3 |
| Water | q.s. | 4.0 | 4.3 |
| Totals | 100 | 100 | 100 |
| HLB Value | 10 | 13 | 10 |
| Emulsion Appearance | Translucent | Milky | Milky |

Samples of Example 1 were subjected to impurity testing, both as non-encapsulated emulsion in glass bottles (Table 2) and as dosage forms according to the invention, i.e., dried capsules containing the emulsion (Table 3).

TABLE 2

| | Time points | | | |
| --- | --- | --- | --- | --- |
| Test | Initial | 2 weeks 25° C./60% | 2 Weeks 30° C./75% | 2 Weeks 40° C./75% |
| Assay of Loperamide HCl (mg/g) | 101.6% | 101.6% | 102.7% | 104.5% |
| Specified impurities (% area) - N-oxide cis + trans | 0.02% | 0.04% | 0.06% | 0.02% |
| Total non-specified impurities (% area) | 0.07% | 0.05% | 0.09% | 0.13% |

TABLE 3

| Test | Initial | 6 month 25° C./60% | 6 month 30° C./75% | 6 month 40° C./75% |
|---|---|---|---|---|
| Assay of Loperamide HCl (mg/g) | 100.7% | 102.3% | 102.1% | 101.2% |
| Specified impurities (% area) - N-oxide cis + trans | 0.02% | 0.110% | 0.094% | 0.147% |
| Total non-specified impurities (% area) | 0.012% | 0.110% | 0.094% | 0.213% |

Example 4 and Comparative Examples A and B

Fill compositions were prepared in the same manner as described in Examples 1-3 having the compositions set forth in Table 4 below.

TABLE 4

| | Example 4 w/w % | Comparative Example A w/w % | Comparative Example B w/w % |
|---|---|---|---|
| Simethicone | 53.6 | 53.6 | 53.6 |
| Loperamide hydrochloride | 0.9 | 0.9 | 0.9 |
| Isopropyl myristate | 25.7 | 25.7 | 25.7 |
| Sorbitan Mono-oleate | 1.3 | 2.3 | 0 |
| Polysorbate 80 | 1.4 | 0.4 | 2.7 |
| Propylene Glycol | 12.9 | 12.9 | 12.9 |
| Water | 4.3 | 4.3 | 4.3 |
| Total Fill Weight | 100 | 100 | 100 |
| HLB | 10 | 6 | 15 |
| Dissolution percentage of loperamide | 105.2 | 102.1 | 62.7 |
| Emulsion Appearance | Translucent | Milky | Translucent |

Unlike Example 4, the fill composition in Comparative Example A separated in one week and the fill composition in Comparative Example B separated in two weeks; stable emulsions were not formed. Example 4, which was a translucent emulsion, was stable and there was no noticeable separation. In addition, no separation was observed in final capsules for over 18 months.

Examples 5-10

Additional fill compositions were prepared in the same manner as described in Examples 1-3 having the compositions set forth in Table 5 below.

TABLE 5

| | Example 5 w/w % | Example 6 w/w % | Example 7 w/w % | Example 8 w/w % | Example 9 w/w % | Example 10 w/w % |
|---|---|---|---|---|---|---|
| Simethicone | 53.2 | 41.3 | 41.3 | 57.0 | 53.2 | 57.0 |
| Loperamide Hydrochloride | 0.85 | 0.54 | 0.54 | 1.07 | 0.85 | 1.07 |
| Isopropyl myristate | 26.1 | 38.0 | 38.0 | 22.3 | 26.1 | 22.3 |
| Sorbitan Mono-oleate | 1.5 | 1.5 | 1.3 | 1.3 | 1.0 | 1.0 |
| Polysorbate 80 | 1.2 | 1.2 | 1.4 | 1.4 | 1.7 | 1.7 |
| Propylene Glycol | 12.8 | 13.1 | 13.1 | 12.5 | 12.8 | 12.5 |
| Butylated hydroxyl anisole | 0.1 | 0.1 | 0.1 | 0.1 | 0.1 | 0.1 |
| Water - Purfied | qs | qs | qs | qs | qs | qs |
| HLB Value | 9 | 9 | 10 | 10 | 11 | 11 |

What is claimed is:

1. An oral pharmaceutical dosage form comprising:
    a capsule shell; and
    a fill composition,
    wherein the fill composition comprises a stable emulsion of (a) simethicone, (b) loperamide or a pharmaceutically acceptable salt thereof, and (c) at least one hydrophilic surfactant and at least one lipophilic surfactant,
    wherein the at least one hydrophilic surfactant is selected from the group consisting of polyethylene glycol (PEG) fatty acid esters, PEG esters, PEG ethers, PEG glycerides, saturated polyglycolysed glycerides, and combinations thereof,
    wherein the at least one lipophilic surfactant is selected from the group consisting of macrogolglycerides, sorbitan esters, monoglycerides, diglycerides, glycol monoesters, glycol diesters, glyceryl esters, PEG esters, propylene glycol laurate, glyceryl monooleate, sorbitan monooleate, medium chain monoglycerides, medium chain diglycerides, and combinations thereof, and
    wherein the surfactants have a combined hydrophilic lipophilic balance (HLB) ranging from about 8 to about 12, wherein the HLB is determined via the Griffin equation.

2. The pharmaceutical dosage form of claim 1, wherein the pharmaceutically acceptable salt is loperamide hydrochloride.

3. The pharmaceutical dosage form of claim 2, wherein the loperamide hydrochloride is present in an amount of 2 mg.

4. The pharmaceutical dosage form of claim 1, wherein the simethicone is present in an amount of 125 mg.

5. The pharmaceutical dosage form of claim 1, wherein the at least one hydrophilic surfactant is polysorbate 80 and the at least one lipophilic surfactant is sorbitan monooleate.

6. The pharmaceutical dosage form of claim 1, wherein the HLB ranges from about 9 to about 11.

7. The pharmaceutical dosage form of claim 1, wherein the fill composition further comprises an additional component selected from the group consisting of diluents, solvents, flavoring agents, and combinations thereof.

8. The pharmaceutical dosage form of claim 1, wherein the capsule shell is a hard capsule shell or a soft capsule shell.

9. The pharmaceutical dosage form of claim 1, wherein the capsule shell is a gelatin-based soft capsule shell.

10. The pharmaceutical dosage form of claim 1, wherein the capsule shell is a non-gelatin based capsule shell.

11. The pharmaceutical dosage form of claim 2, wherein the loperamide hydrochloride is present in an amount of from about 0.2 w/w % to about 2.7 w/w % by weight of the fill composition.

12. The pharmaceutical dosage form of claim 1, wherein the simethicone is present in an amount of from about 4 w/w % to about 66 w/w % by weight of the fill composition.

13. A process of preparing the pharmaceutical dosage form of claim 1 comprising the steps of:
(a) preparing the fill composition; and
(b) encapsulating the fill composition in the capsule shell.

14. The process of claim 13, wherein step (a) comprises making the emulsion.

15. The process of claim 14, wherein step (a) comprises a sub-step (a1) of making a solution of loperamide or a pharmaceutically acceptable salt thereof.

16. The process of claim 15, wherein the solution is made by dissolving the loperamide or a pharmaceutically acceptable salt thereof in a solvent selected from the group consisting of polyethylene glycol, glycerol, propylene glycol, ethylene glycol, water and combinations thereof.

17. The process of claim 16 further comprising adding an antioxidant to the solution.

18. The process of claim 13, wherein step (a) comprises a sub-step (a2) of diluting the simethicone with isopropyl myristate.

19. The process of claim 13, wherein the emulsion is made without the use of high shear mixing.

20. A method of treating a human having gastrointestinal distress characterized by the symptoms of diarrhea and/or flatulence or gas comprising:
orally administering to the human in need thereof a therapeutically effective amount of the pharmaceutical dosage form of claim 1.

* * * * *